(12) United States Patent
Imura

(10) Patent No.: US 7,935,914 B2
(45) Date of Patent: May 3, 2011

(54) PRESSURE COOKER

(76) Inventor: Mamoru Imura, Overland Park, KS (US)

( * ) Notice: Subject to any disclaimer, the term of this patent is extended or adjusted under 35 U.S.C. 154(b) by 0 days.

(21) Appl. No.: 11/266,148

(22) Filed: Nov. 3, 2005

(65) Prior Publication Data

US 2006/0112834 A1 Jun. 1, 2006

Related U.S. Application Data

(63) Continuation-in-part of application No. 10/833,356, filed on Apr. 28, 2004, now Pat. No. 7,157,675.

(60) Provisional application No. 60/624,834, filed on Nov. 3, 2004.

(51) Int. Cl.
H05B 6/12 (2006.01)
H05B 6/66 (2006.01)

(52) U.S. Cl. .................................. 219/627; 219/702

(58) Field of Classification Search .............. 219/627, 219/620, 625, 667, 710, 494, 618, 490, 713, 219/714, 702, 626, 495; 374/149; 99/366
See application file for complete search history.

(56) References Cited

U.S. PATENT DOCUMENTS

| | | | |
|---|---|---|---|
| 3,742,178 A | | 6/1973 | Hamden, Jr. |
| 3,742,179 A | | 6/1973 | Hamden, Jr. |
| 4,627,417 A | * | 12/1986 | von der Becke et al. ..... 126/369 |
| 5,441,344 A | | 8/1995 | Cook, III |
| 5,951,900 A | | 9/1999 | Smrke |
| 5,954,984 A | | 9/1999 | Ablah et al. |
| 6,206,564 B1 | | 3/2001 | Adamczewski |
| 6,232,585 B1 | | 5/2001 | Clothier et al. |
| 6,274,856 B1 | * | 8/2001 | Clothier et al. ............... 219/627 |
| 6,316,753 B2 | * | 11/2001 | Clothier et al. ............... 219/621 |
| 6,320,169 B1 | * | 11/2001 | Clothier ........................ 219/626 |
| 6,444,961 B2 | | 9/2002 | Clothier et al. |
| 6,504,135 B2 | | 1/2003 | Clothier et al. |
| 6,512,211 B1 | | 1/2003 | Lockhart et al. |
| 6,563,087 B1 | | 5/2003 | Yokoyama et al. |
| 6,657,170 B2 | | 12/2003 | Clothier |
| 6,664,520 B2 | | 12/2003 | Clothier |
| 6,822,204 B2 | | 11/2004 | Clothier |
| 6,953,919 B2 | * | 10/2005 | Clothier ........................ 219/620 |
| 2002/0069766 A1 | * | 6/2002 | Paul et al. ...................... 99/366 |
| 2003/0185276 A1 | * | 10/2003 | Reutter ........................ 374/146 |
| 2004/0016348 A1 | | 1/2004 | Sharpe |

OTHER PUBLICATIONS

First Amended Complaint in Case No. 08-CV-2220-JWL-DJW, *Thermal Solutions, Inc.* v. *Imura International U.S.A. Inc., Vita Craft Corporation, and Mamoru Imura*, Jul. 11, 2008.

* cited by examiner

*Primary Examiner* — Daniel Robinson
(74) *Attorney, Agent, or Firm* — Kutak Rock LLP; Bryan P Stanley

(57) ABSTRACT

A sealed cookware and servingware object, such as a pressure cooker, is provided. The object is temperature and pressure regulated using control technology such as Radio Frequency Identification (RFID) technology and temperature sensors associated with the objects. In a first embodiment, the temperature sensor is at least partially embedded in the base of the object. In a second embodiment, the temperature sensor extends through a tunnel in a wall of the object and includes a sealing cap to cover the tunnel and prevent air and/or liquid from escaping the interior of the object.

15 Claims, 3 Drawing Sheets

PRESSURE COOKER

CROSS-REFERENCE TO RELATED APPLICATIONS

This application claims priority pursuant to 35 U.S.C. 119(e) to co-pending U.S. Provisional Patent Application Ser. No. 60/624,834, filed Nov. 3, 2004, the entire disclosure of which is incorporated herein by reference. This application is a continuation-in-part of U.S. application Ser. No. 10/833,356 filed Apr. 28, 2004 now U.S. Pat. No. 7,157,675, the disclosures of which is incorporated herein by reference in its entirety.

FIELD OF THE INVENTION

The present invention is broadly concerned with temperature regulated cookware and servingware items, such as pots, pans, buffet serving pans, serving dishes, platters, and the like. More particularly, the invention is concerned with sealed cookware and servingware objects, such as pressure cookers, that are temperature and pressure regulated using control technology such as Radio Frequency Identification (RFID) technology and temperature sensors associated with the objects.

BACKGROUND OF THE INVENTION

Cooking is often referred to as an art, not only because of the combination of ingredients that go into a particular recipe, but also due to the skill necessary for proper application and infusion of varying levels of heat over a given period of time throughout the different phases of the food preparation process. Traditional cookware appliances, such as ovens (microwave ovens being an exception), grills, heat lamps and stoves, all utilize the thermodynamic process of conduction to transfer heat from the outer surface of the food item to its interior. This is generally true regardless of the type of heat source used to heat the surface of the food, be it a radiation heat source (i.e. a heat lamp), conduction heat source (i.e. a stovetop), or a convection heat source (i.e. a convection oven or a food dehydrator).

The use of thermometers or other temperature sensors to monitor and control the cooking process is well known. A common thermometer used to monitor and control the cooking process is a probe-type or contact thermometer which is inserted directly into the food item to obtain a temperature of the interior of the food item. Such thermometers are undesirable for use with cookware/servingware objects that have a lid as the use of a probe-type thermometer requires removal of the lid each time a temperature reading is taken. A number of cookware-associated non-contact thermometers have been developed that are attached to, or incorporated into, cookware objects such as pots and pans. For example, my invention disclosed in U.S. patent application Ser. No. 10/833,356, which is incorporated herein by reference in its entirety, provides a means of obtaining consistent and accurate measurement and control of the temperature of a cookware object, such as a pot or pan, by embedding a temperature sensor within a heatable portion of an object, such as within a tunnel through the base of the pot or pan. The temperature sensor is connected to an RFID tag located apart from the heatable portion of the pot or pan. The RFID tag acts as a transmitter (and sometimes as receiver) to communicate with a reader/writer located in a cook-top for heating the object, providing temperature information and other information regarding the object (such as heating characteristics) to the cook-top. The temperature information and the heating information are used by the cook-top to control the temperature of the object.

A pressure cooker is a cookware object such as a pot that includes an airtight lid that seals and locks to the main body of the pot. Food items are placed in the pressure cooker along with liquid (usually water) and the pressure cooker is heated. As the liquid temperature rises, the liquid boils creating steam. The steam is trapped within the pressure cooker by the sealed lid, causing the pressure within the pot to increase. As the pressure increases, the temperature at which the liquid will boil increases resulting in a higher cooking temperature within the pot. This increased cooking temperature reduces cooking time from that obtained by boiling water at atmospheric pressure in unsealed cookware. In addition, steam has a much higher heat transfer potential than a liquid at the same temperature, further decreasing cooking time. A secondary benefit of the increased pressure is that it softens the fibers in foods, tenderizing the food. The increased internal temperature, steam and tenderization of foods cooked under pressure combine to decrease by two-thirds or more of the normal cooking times.

FIG. 1 shows a typical prior art pressure cooker, 10, in which temperature within pressure cooker 10 is regulated by measuring and controlling the pressure within cooker 10. As is shown in FIG. 1, pressure cooker 10 includes typical components found in many pressure cookers, including pressure regulator 20, which is connected to the inner chamber of pressure cooker 10 by vent pipe 30, over-pressure plug 40, sealing ring 50, air vent/cover lock 60, lock pin 70, cover handle 80, and cocking rack 90. Generally, pressure cooker 10 is placed on a stove or other similar heat source and heated until the desired pressure as indicated on pressure regulator 20 is achieved. Once the desired pressure is obtained, the heat is reduced to maintain a constant temperature and pressure within cooker 10. Maintaining a constant temperature and pressure within pressure cooker 10 is often difficult to do manually, taking a considerable amount of trial and error in adjusting the stove temperature. Therefore, it would be beneficial to provide a means of easily regulating/maintaining a constant temperature and pressure within the pressure cooker.

Although my prior invention in which the temperature sensor is embedded within a tunnel in the base, as disclosed in U.S. patent application Ser. No. 10/833,356, and in and U.S. application Ser. No. 11/148,802 filed Jun. 9, 2005 (the disclosure of which is incorporated herein in its entirety), provides a highly effective way of regulating temperature during cooking and may be used in connection with a pressure cooker (as is discussed below), it is most beneficial for use in non-sealed cookware and/or servingware in which the most useful temperature measurement is the temperature at the center of the base of the object where the food items are usually positioned and also where the highest temperature reading will be found. While still important, the temperature at the center of the base of a sealed cookware and/or servingware object, such as a pressure cooker, is secondary to the temperature of the steam created within the pressure cooker. Using the embedded sensor in the base as in my prior invention requires a mathematical extrapolation to determine the actual temperature of the steam within a pressure cooker due to the temperature differential between the interior of the cooker and the temperature of the cooker walls. As the pressure within the pressure cooker is proportional to the temperature, even minor inaccuracies in the temperature measurement can be critical and result in overcooking or undercooking. Therefore, it would be beneficial to provide a means of obtaining a temperature reading from the interior of a pressure cooker for use in regulating/maintaining the temperature and pressure of the cooker.

SUMMARY OF THE INVENTION

An object of the instant invention is to provide a temperature regulated item (or object). Another object of the instant invention is to provide a sealed temperature regulated item, such as a pressure cooker. Yet another object of the instant invention is to provide a sealed temperature regulated item in which the temperature reading provides an accurate indication of the temperature of the interior of the item. Still another object of the instant invention is to provide a sealed temperature regulated item in which the temperature reading provides an accurate indication of the temperature within the item, and which can be used with traditional or induction heating devices.

The above described objects are achieved using a temperature regulated object including a heatable body, a temperature sensor, an RFID tag (or other suitable transmitter/receiver), and a lid. In a first embodiment of the instant invention, the temperature sensor is embedded in the base of the pressure cooker and connected to an RFID tag in the manner and including the components described in U.S. patent application Ser. No. 10/833,356, and/or in and U.S. application Ser. No. 11/148,802. In a second embodiment of the instant invention, the temperature sensor extends through a tunnel in the wall of the heatable body of the object, and is connected to the RFID tag by a pair of wires. The RFID tag acts as a transmitter (and sometimes as receiver) to communicate with a reader/writer located in a cook-top for heating the object, providing temperature information and other information regarding the object (such as heating characteristics) to the cook-top. The temperature information and the heating information are used by the cook-top to control the temperature and pressure within the object.

In a preferred embodiment the heatable object is a sealed object such as a pressure cooker. In the embodiment in which the temperature sensor extends through the wall of the cooker, the head of the temperature sensor is inserted through the tunnel in the body of the cooker from the outer surface so as to be generally flush with the inner surface of the wall of the body. A sealing cap is then positioned and crimped over (or otherwise connected to or in close contact with) the head of the sensor. In an alternative embodiment, the sealing cap is an integral part of the temperature sensor, and the sensor is inserted through the tunnel in the body of the cooker from the inner surface toward the exterior surface. The tunnel and the sealing cap may also include a potting material to surround the sensor. The sealing cap may be in the form of a screw, rivet or a plug that includes a cylindrical member that fits within the tunnel and in which the head of the temperature sensor fits, and that also includes a head that has a diameter greater than the diameter of the tunnel to fully cover the tunnel and formed to fit to the interior surface of the cooker body wall closely. The sealing cap and potting material combine to seal the tunnel and prevent air and/or liquid from escaping the interior of the cooker during pressurized cooking.

The sealing cap of the instant invention is made of a material having a high thermal conductivity, such as a conductive silicon, metal or other suitable material. The highly conductive material allows the temperature sensor to obtain a highly accurate temperature reading for the interior of the object.

The tunnel through the wall of the object of the instant invention is located at a position towards the top half to top third of the object, above the food/liquid line for the object. Typically, pressure cookers are designed to be filled no more than two-thirds full to prevent boiling over. Thus, locating the temperature sensor above the food/liquid line for the object results in the sensor obtaining a temperature reading for the steam, and not the temperature of the food/liquid.

In a preferred embodiment the body and lid are manufactured in a manner known in the art for pots and pan, and in particular pressure cookers, and the tunnel is then drilled through the wall of the body. Nevertheless, it will be appreciated that the body can be manufactured to include the tunnel, such as by casting or any other suitable process. In addition to the temperature sensor, the heatable object of the instant invention may include all of the components of prior art pressure cookers, including but not limited to a pressure regulator, vent pipe, over pressure plug, sealing ring, air vent/cover lock, lock pin, and cooking rack, and the like. Furthermore, it will be appreciated that the instant invention can be used in connection with any heating source, including induction, gas, electric, etc.

The RFID tag is located within a cavity formed in the handle of the object of the instant invention to position the tag outside of the heat-generation zone for the object. This reduces the temperature to which the tag is subjected, maximizing the life of the tag. The handle holds the RFID tag parallel to the cook-top surface for maximum signal strength during operation.

The heatable objects of preferred embodiments of the instant invention are constructed and operates in a manner similar to the cookware/servingware objects disclosed in U.S. patent application Ser. No. 10/833,356, and/or in and U.S. application Ser. No. 11/148,802, utilizing the same or similar components and materials, including the materials for the body of the object, the handle materials, the RFID tag, RFID reader/writer and the RTD sensor. Nevertheless, it will be appreciated that alternative manners of construction and operation may be developed without departing from the spirit and scope of the instant invention, and modifications to certain components may be made to accommodate the location of the temperature sensor in the instant invention.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present inventions is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
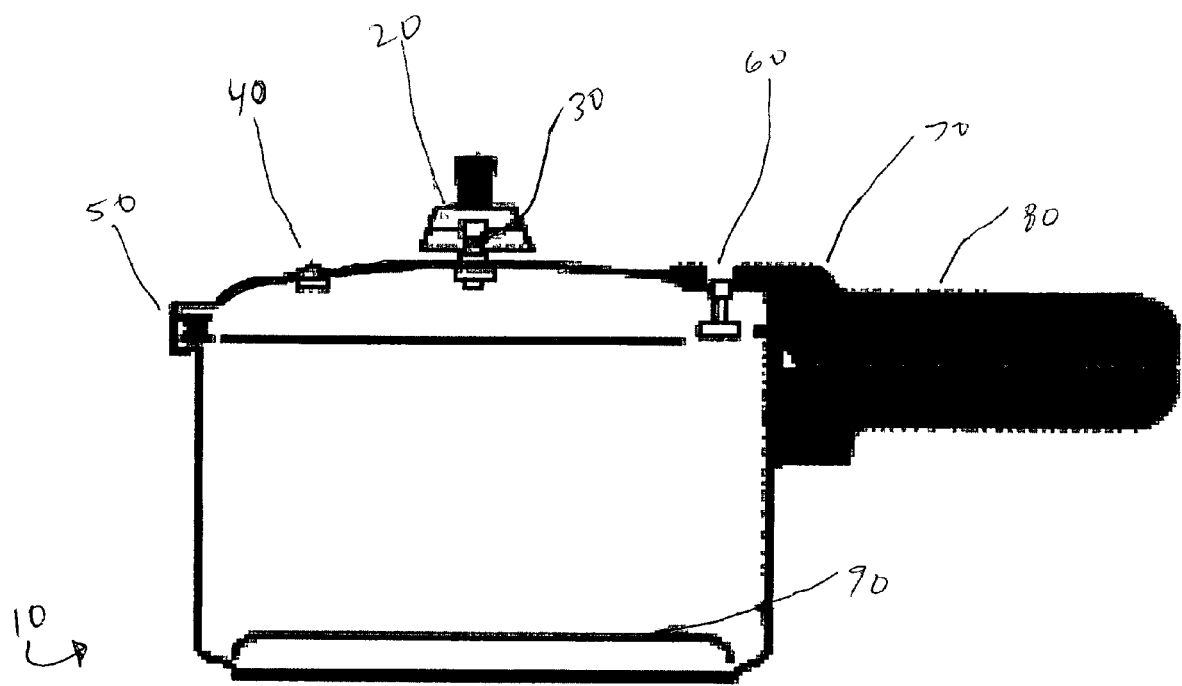
FIG. 1 is an elevation view of a prior art pressure cooker, showing the common components of a typical pressure cooker.
Figure 2:
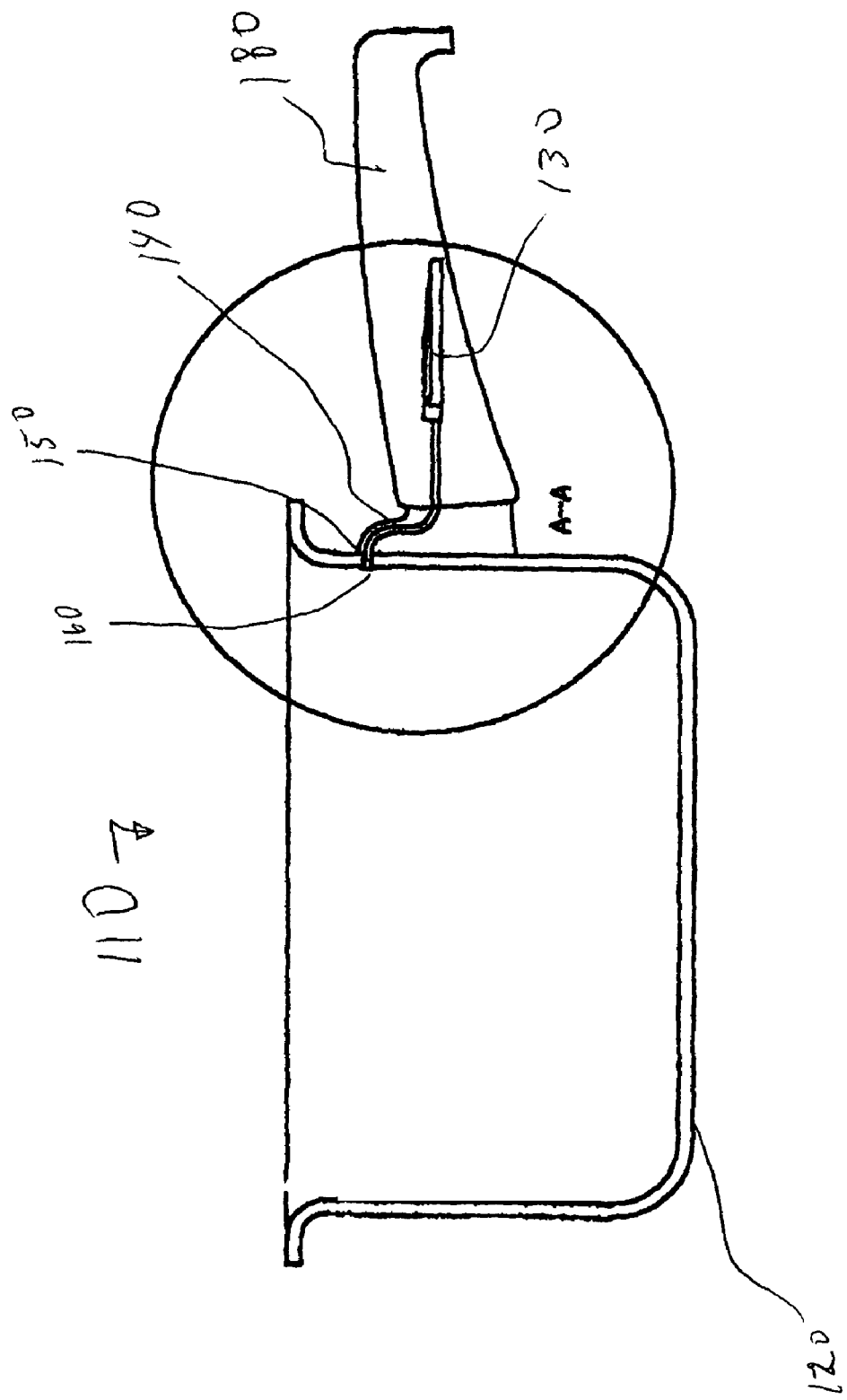
FIG. 2 is a section elevation view of an RFID controlled pressure cooker of the instant invention in which a temperature sensor extends through the wall of the cooker.
Figure 3:
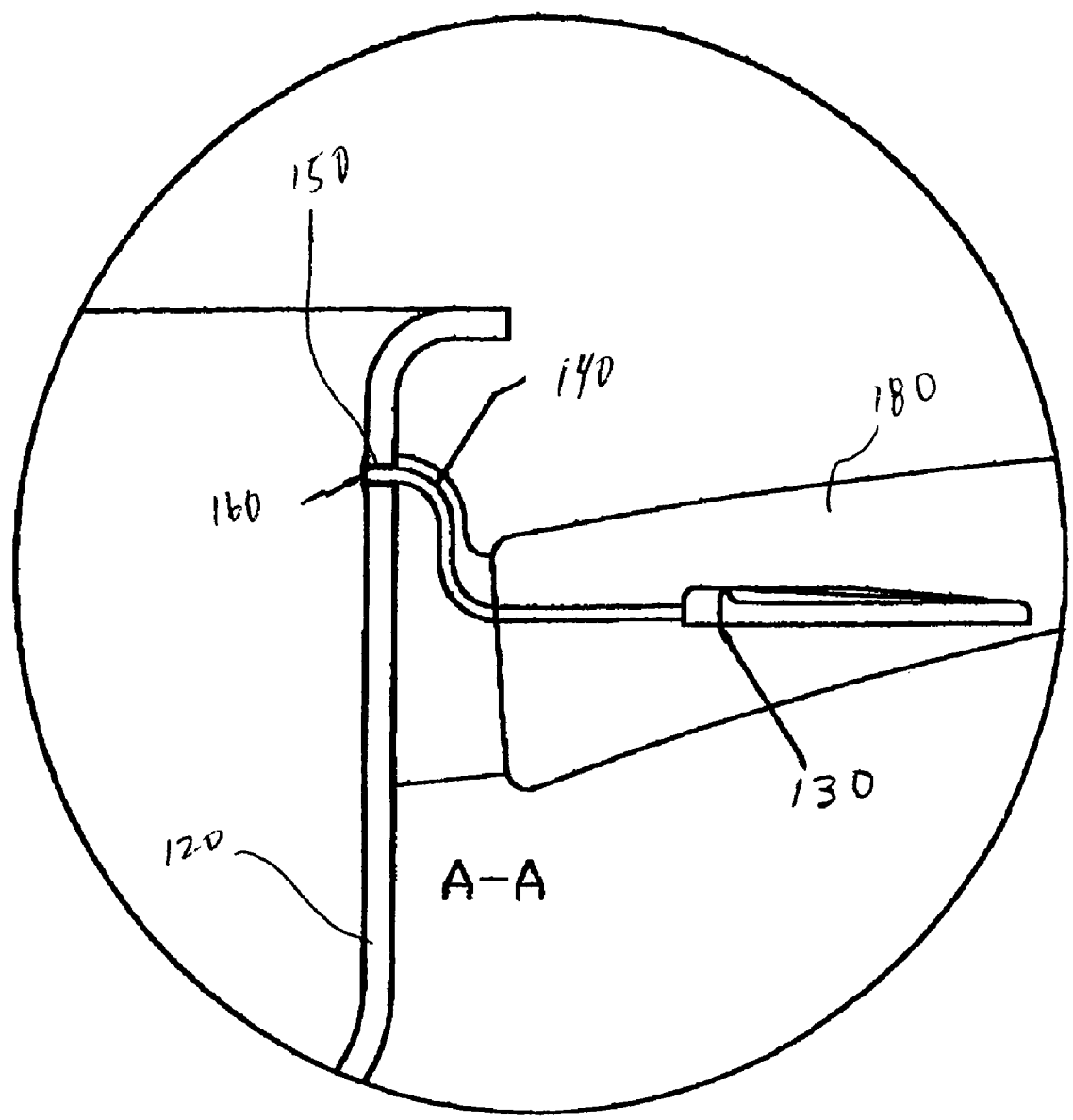
FIG. 3 is an exploded partial section view taken along circle A-A of FIG. 2 showing the pressure cooker, temperature sensor and RFID tag in detail.

Referring to FIGS. 2 and 3, a pressure cooker in which a temperature sensor extends through the wall of the cooker is shown. As is shown in FIG. 2, pressure cooker 110 includes heatable body 120, handle 180 in which RFID tag 130 is located, and temperature sensor 150 located within a tunnel that passes through the wall of body 120. Temperature sensor 150 is connected to RFID tag 130 by conductors 140, and includes sealing cap 160 positioned over the head of sensor 150. As is shown in FIGS. 2 and 3, sealing cap 160 includes a diameter that is greater than the diameter of the tunnel that passes through the wall of body 120.

In a preferred embodiment of pressure cooker 110, RFID tag 130, conductors 140, and temperature sensor 150 are assembled as an RFID tag assembly in the same manner described in U.S. application Ser. No. 11/148,802. The RFID tag assembly includes RFID tag 130, a tag overmolding, temperature sensor 150, and conductor wires 140 connecting RFID tag 130 to temperature sensor 150. The tag overmolding is a shell that surrounds the RFID tag and which is filled with an epoxy-based material to waterproof and generally protect RFID tag 130. The shell also functions as a stiffener for conductor wires 140 that are connected to terminal pads on RFID tag 130. Conductor wires 140 include two conductor wires (such as nickel metal copper, or other similar conducting material) that are embedded within a mineral insulation of a mineral insulated cable. Temperature sensor 150 is attached to the exposed opposing ends of conductor wires 140 from RFID tag 130. Sealing cap 160 is positioned over sensor 150 with a potting material (such as a silicone or ceramic material) in cap 160 surrounding temperature sensor 150. Sealing cap 160 is then laser welded to a stainless steel sheath of the mineral insulated cable to provide a sealed connection between temperature sensor 150 and wires 140. Sealing cap 160 may be welded over sensor 150 prior to positioning of sensor 150 through the wall of cooker body 120. In such case, wires 140 are pushed through the tunnel in the wall of body 120 from the interior (cooking area) of cooker 110 towards the exterior prior to being connected to the terminal pads of RFID tag 130. Alternatively, temperature sensor 150 may be pushed through the tunnel in the wall of body 120 from the exterior towards the interior, and then cap 160 is positioned around sensor 150 from the interior of cooker 110 and laser welded.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A pressure cooker comprising:
   a body;
   a tunnel extending through a wall of said body;
   a temperature sensor extending through said tunnel; and
   a sealing cap surrounding at least a portion of said temperature sensor and covering an opening of said tunnel, said sealing cap further covering a head of said temperature sensor such that said sealing cap prevents said head of said temperature sensor from penetrating through said sealing cap; and
   a device associated with said temperature sensor and located outside of said body, said device being operable to obtain temperature information obtained by said temperature sensor.

2. The pressure cooker as claimed in claim 1, wherein said sealing cap includes an outer diameter that is greater than a diameter of said tunnel.

3. The pressure cooker as claimed in claim 1, further comprising:
   a handle extending from said wall of said body; and
   a handle extension portion that extends from said handle to direct said temperature sensor into said tunnel.

4. The pressure cooker as claimed in claim 3, wherein the handle extension portion extends upwards from said handle and conceals said tunnel.

5. The pressure cooker as claimed in claim 3, further comprising:
   a first thickness of said handle extension portion; and
   a second thickness of said handle,
   wherein said first thickness of the handle extension portion is less than said second thickness of the handle.

6. The pressure cooker as claimed in claim 1, wherein said sealing cap is substantially contained within said wall of said body.

7. The pressure cooker as claimed in claim 1, wherein said temperature sensor does not penetrate said wall of said body.

8. The pressure cooker as claimed in claim 1, further comprising:
   a conductor that connects to said temperature sensor to said device.

9. The pressure cooker as claimed in claim 8, further comprising:
   a handle to support said conductor and said device.

10. The pressure cooker as claimed in claim 1, further comprising:
    a handle extending from said wall of said body;
    a handle extension portion that extends from said handle;
    a conductor first portion that extends through said handle;
    a conductor second portion that connects with said conductor first portion and extends through said handle extension portion.

11. The pressure cooker as claimed in claim 1, further comprising:
    a handle extending from said wall of said body;
    a conductor portion extending through said handle,
    wherein said handle guides the conductor portion in different directions through said handle and into said tunnel.

12. The pressure cooker as claimed in claim 1, further comprising:
    a handle extending from said wall of said body;
    a conductor portion extending through said handle,
    wherein said handle guides the conductor portion in different directions through said handle and into said tunnel.

13. The pressure cooker as claimed in claim 8, wherein said device is an RFID tag.

14. The pressure cooker as claimed in claim 13, wherein said RFID tag is operable to communicate temperature information obtained by said temperature sensor with a heating device.

15. A radio frequency identification controlled pressure cooker comprising:
    a temperature sensor at least partially embedded within a tunnel in a heatable portion of the pressure cooker;
    a sealing cap surrounding at least a portion of said temperature sensor and covering an opening of said tunnel, said sealing cap further covering a head of said temperature sensor such that said sealing cap prevents said head of said temperature sensor from penetrating through said sealing cap; and
    a radio frequency identification tag associated with said temperature sensor and located outside of a heat-generation zone for the pressure cooker, said tag being operable to communicate temperature information obtained by said temperature sensor with a heating device.

* * * * *